(12) United States Patent
Lim et al.

(10) Patent No.: US 8,990,113 B2
(45) Date of Patent: Mar. 24, 2015

(54) INTERACTIVE INFORMATION PROCESSING AND DELIVERY SYSTEM AND METHODS THEREOF

(75) Inventors: Chee Meng Lim, Singapore (SG); Chee Keong Lim, Mendon Spring (SG)

(73) Assignee: Unified Information System Pte. Ltd.

( * ) Notice: Subject to any disclaimer, the term of this patent is extended or adjusted under 35 U.S.C. 154(b) by 974 days.

(21) Appl. No.: 12/812,271

(22) PCT Filed: Jun. 9, 2008

(86) PCT No.: PCT/SG2008/000210
§ 371 (c)(1),
(2), (4) Date: Jul. 9, 2010

(87) PCT Pub. No.: WO2009/091338
PCT Pub. Date: Jul. 23, 2009

(65) Prior Publication Data
US 2010/0280931 A1    Nov. 4, 2010

(30) Foreign Application Priority Data

Jan. 15, 2008   (SG) .............................. 200800309-7

(51) Int. Cl.
*G07F 19/00* (2006.01)
*H04M 15/00* (2006.01)
*H04N 7/173* (2011.01)
(Continued)

(52) U.S. Cl.
CPC ........... *H04N 7/17318* (2013.01); *G06Q 30/02* (2013.01); *G06Q 30/04* (2013.01); *H04N 21/2408* (2013.01); *H04N 21/25875* (2013.01);
(Continued)

(58) Field of Classification Search
CPC .................................................... G06Q 20/102
USPC ..................................................... 705/34, 31
See application file for complete search history.

(56) References Cited

U.S. PATENT DOCUMENTS

2001/0053687 A1* 12/2001 Sivula ........................... 455/412
2002/0002533 A1*  1/2002 Singhal .......................... 705/39
(Continued)

FOREIGN PATENT DOCUMENTS

WO    WO 00/52621 A2    9/2000
WO    WO 2004/079694 A2    9/2004

OTHER PUBLICATIONS

International Searching Authority, International Search Report and Written Opinion for International Application No. PCT/SG2008/000210, Aug. 13, 2008, 10 pages, Australian Patent Office.
(Continued)

*Primary Examiner* — Seye Iwarere
(74) *Attorney, Agent, or Firm* — Alston & Bird LLP

(57) ABSTRACT

Embodiments of the invention relate to systems and methods for information processing and delivery to a selected group of network-connected display devices. In one embodiment of the invention, an information processing and delivery method comprises receiving a request from one of a plurality of users in which the request includes a content data, a display identifier and a user identifier. The method also comprises validating the content data and the display identifier, and upon successful validation, transmitting the content data through an Internet Protocol (IP) based network to at least one display device associated with the display identifier for display thereon.

44 Claims, 6 Drawing Sheets

(51) Int. Cl.
    *G06Q 30/02*     (2012.01)
    *G06Q 30/04*     (2012.01)
    *H04N 21/24*     (2011.01)
    *H04N 21/258*     (2011.01)
    *H04N 21/414*     (2011.01)
    *H04N 21/4722*     (2011.01)
    *H04N 21/81*     (2011.01)

(52) U.S. Cl.
    CPC ..... *H04N 21/41415* (2013.01); *H04N 21/4722* (2013.01); *H04N 21/812* (2013.01)
    USPC .......................................................... 705/34

(56) References Cited

U.S. PATENT DOCUMENTS

| | | | | |
|---|---|---|---|---|
| 2002/0136390 | A1* | 9/2002 | Lang et al. | 379/222 |
| 2003/0003953 | A1* | 1/2003 | Houplain | 455/553 |
| 2003/0203731 | A1* | 10/2003 | King et al. | 455/407 |
| 2004/0029569 | A1* | 2/2004 | Khan et al. | 455/414.1 |
| 2004/0176067 | A1* | 9/2004 | Lakhani et al. | 455/406 |
| 2005/0009500 | A1* | 1/2005 | Ear | 455/408 |
| 2005/0140497 | A1* | 6/2005 | Chiviendacz et al. | 340/5.67 |
| 2005/0144451 | A1* | 6/2005 | Voice et al. | 713/170 |
| 2005/0261928 | A1 | 11/2005 | Skeadas | |
| 2006/0029296 | A1* | 2/2006 | King et al. | 382/313 |
| 2006/0121880 | A1* | 6/2006 | Cowsar et al. | 455/406 |
| 2006/0141923 | A1* | 6/2006 | Goss | 455/3.01 |
| 2006/0217107 | A1* | 9/2006 | Maes | 455/405 |
| 2008/0261558 | A1* | 10/2008 | Enriquez | 455/406 |
| 2008/0303745 | A1* | 12/2008 | Tseng et al. | 345/1.1 |
| 2009/0149154 | A1* | 6/2009 | Bhasin et al. | 455/406 |
| 2009/0253405 | A1* | 10/2009 | Yang | 455/406 |
| 2010/0029308 | A1* | 2/2010 | Tims et al. | 455/466 |

OTHER PUBLICATIONS

International Preliminary Examining Authority, *Corrected* International Preliminary Report on Patentability for International Application No. PCT/SG2008/000210, Dec. 11, 2008, 10 pages, Australian Patent Office.

European Patent Office, Extended European Search Report for Application No. 08767289.5, Mar. 17, 2011, 4 pages, Germany.

Korean Intellectual Property Office, Decision of Patent Grant for Application No. 10-2010-7015207, Oct. 28, 2014, 3 pages, Korea.

* cited by examiner

INTERACTIVE INFORMATION PROCESSING AND DELIVERY SYSTEM AND METHODS THEREOF

BACKGROUND

1. Technical Field

Embodiments of the invention generally relate to systems and methods for information processing and delivery to a selected group of network-connected display devices.

2. Description of Related Art

Traditionally, out-of-home advertising is typically conveyed via different advertising channels, the most common being using large posters, painted or hung on the sides of buildings or even erecting free-standing billboards above the buildings. They provide an extremely attractive way to grab the attention of viewers who are in the proximity of the buildings. In addition, recent advances in technology have created new advertising channels to promote products and services. One example is the kiosk-type billboards (hereinafter referred to as billboards) typically located in retail outlets, such as shopping malls, airports or hotel lobbies. Examples of such billboards include scrolling billboards and digital signage. The billboards typically loop through a series of poster-type advertisements promoting movies, products and/or retail outlets located in the vicinity of the billboards to induce specific customer behavior.

The billboards usually operate by executing a predetermined advertising cycle in which each advertisement is displayed for a predetermined time period before the billboards automatically cycle to display the next advertisement in the loop. Contents of the billboards are changed and updated on a frequent basis by manually replacing the roll of printed advertisements that provides the loop or modifying the electronic content of the advertisements to be displayed by the digital signage. Thus, it is evident that system management problems associated with use of the billboards exist due to the tedious efforts required to periodically update the contents of the billboards. In addition, the billboards normally do not provide viewers with means for interaction within the context of the displayed advertisements. Furthermore, sale of advertising space and creation of an effective advertising campaign within a given budget in such a system are also made complicated due to the distributed deployment nature of the billboards.

SUMMARY

Embodiments of the invention disclosed herein provide information processing and delivery of various types of contents, including but not limited to, solicitation-based contents such as advertisements, and information-based contents such as event announcements.

In one embodiment of the invention, an information processing and delivery method comprises receiving a request from one of a plurality of users in which the request includes a content data, a display identifier and a user identifier. The method also comprises validating the content data and the display identifier, and upon successful validation, transmitting the content data through an Internet Protocol (IP) based network to at least one display device associated with the display identifier for display thereon. A system for implementing the above method may comprise an input processing module, a content processing module and a content delivery module.

BRIEF DESCRIPTION OF THE DRAWINGS

Embodiments of the invention are disclosed hereinafter with reference to the drawings, in which.

DETAILED DESCRIPTION

Figure 1:
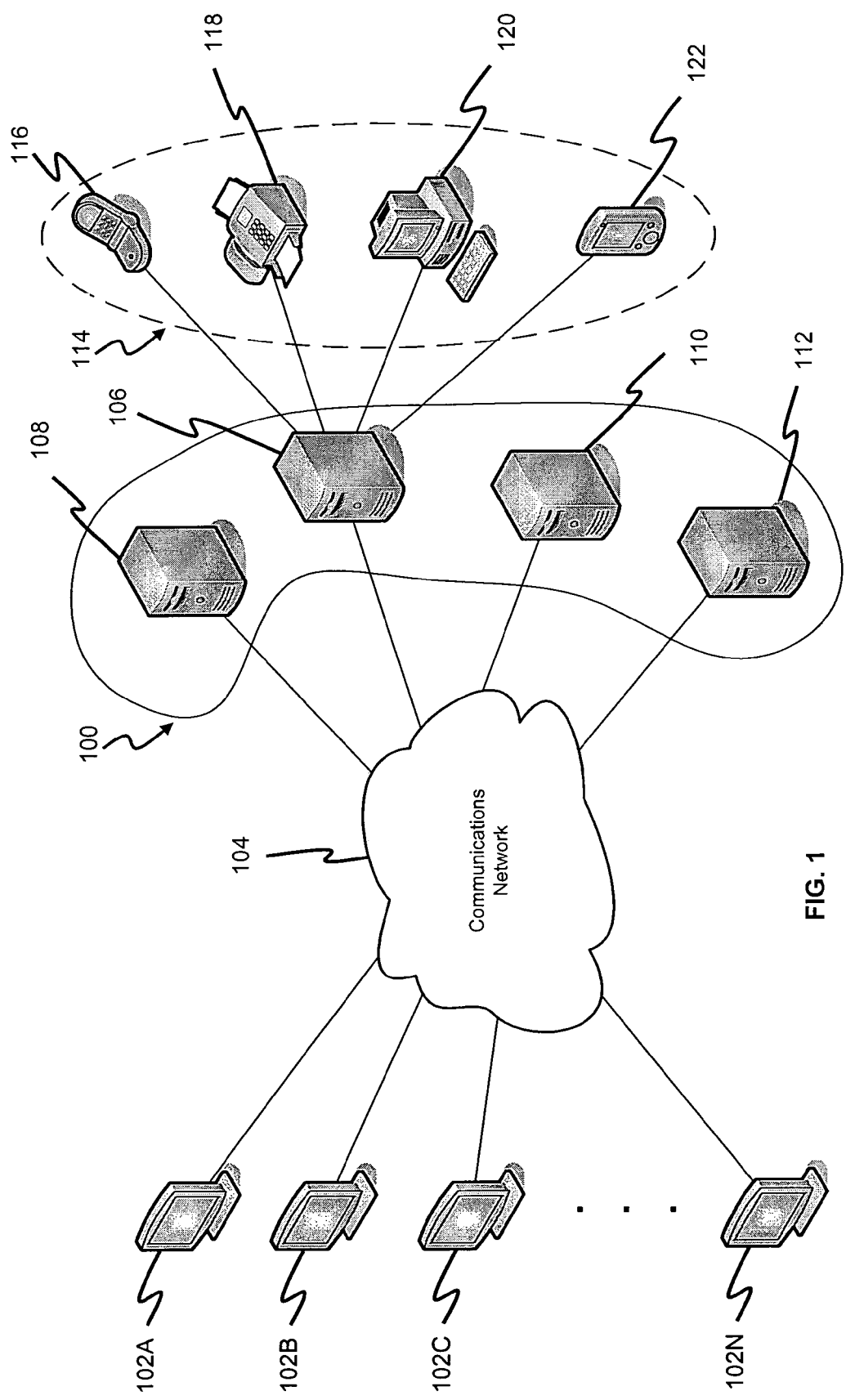
FIG. 1 illustrates the system components of an information processing and delivery system in accordance with an embodiment of the invention.

Reference will now be made in detail to embodiments of the present invention, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments. In the drawings, like reference numerals refer to like elements or functionalities throughout the several presented views.

It will also be understood that, although the terms first, second and etc. may be used herein to describe various elements, these elements should not be limited by these terms. These terms are only used to distinguish one element from another, without departing from the scope of the present invention.

FIG. 1 illustrates the system components of an information processing and delivery system 100 for managing requests from users to thereby display the contents provided therein on selected display devices 102A, 102B, 102C, . . . , 102N in accordance with one embodiment of the invention. Users of the information processing and delivery system 100 may be members of the public or merchants who wish to advertise their goods and/or services. Both the information processing and delivery system 100 and the display devices 102A, 102B, 102C, . . . , 102N are connected to a communications network 104 which allows bi-directional communications between the information processing and delivery system 100 and the display devices 102A, 102B, 102C, . . . , 102N. The display devices 102A, 102B, 102C, . . . , 102N may be geographically distributed in an area such as, for example, a shopping area, a campus, a city, a region or a state. The communications network 104 may take the form of the Internet, a private network such as a Wireless-LAN (WLAN) or other suitable communications networks. The communication network 104 may be implemented either as a wired or wireless network. Each of the display devices 102A, 102B, 102C, . . . , 102N has a display screen which may be a liquid crystal display (LCD) display screen, a plasma display screen, a projection display screen, a holographic-type display or an organic light-emitting diode (OLED) screen. Alternatively, the display devices 102A, 102B, 102C, . . . , 102N may be digital signage such as electronic billboards. It is to be appreciated that other types of display screens are also possible. In addition, each of the display devices 102A, 102B, 102C, . . . , 102N may also include speakers or other audio output devices. Yet additionally, the display devices 102A, 102B, 102C, . . . , 102N may be connected to one or more printer devices for printing out information or materials, such as incentives, related to the content output by the display devices 102A, 102B, 102C, . . . , 102N.

Furthermore, each of the display devices 102A, 102B, 102C, . . . , 102N may also include provisions for enabling one or more interactive features that allow viewers to obtain more information on the contents being displayed. For example, a viewer can obtain more information on products promoted in an advertisement message displayed on the display devices 102A, 102B, 102C, . . . , 102N, download incentives related to the products, provide information about the viewers themselves or engage in other related interactive activities. Examples of the interactive features include, but are not limited to, email addresses, fax numbers, website addresses, contact number for sending short message service (SMS) or multimedia messaging service (MMS) messages.

The information processing and delivery system 100 as depicted in FIG. 1 comprises the following components: a communications interface manager 106 (i.e. an input processing module), a content processor 108 (i.e. a content processing module), a content dispatcher 110 (i.e. a content delivery module) and a transaction manager 112 (i.e. a transaction processing module). The communications interface manager 106, the content processor 108, the content dispatcher 110 and the transaction manager 112 may be implemented as software modules executed on separate computer hardware such as specialized rack-based systems (i.e. blade servers). In certain embodiments, the communications interface manager 106, the content processor 108, the content dispatcher 110 and the transaction manager 112 are each implemented as an application-specific integrated circuit (ASIC) or a combination of hardware and software or other suitable configurations. In yet other embodiments, the communications interface manager 106, the content processor 108, the content dispatcher 110 and the transaction manager 112 may be combined as a single module or separated into multiple additional modules.

As depicted in FIG. 1, the communications interface manager 106 serves as a communication gateway to facilitate exchange of information between the information processing and delivery system 100 and the users via input devices 114. Examples of the input devices 114 include, but are not limited to, a cellular phone 116, a fax machine 118, a computer 120 and a mobile computing device 122. Mobile computing devices 122 may include PDAs, Smartphones, Tablet PCs, mobile Internet devices (MIDs) and ultra-mobile PCs (UMPCs). The communications interface manager 106 receive the requests from the input devices 114 using a mixture digital and analog communication protocols including, but not limited to, short message service (SMS), multimedia messaging service (MMS), fax, email and the Internet Protocol (IP). The communications interface manager 106 establishes communication with the input devices 114 through use of software protocol-plugins (not shown) such as a fax-plugin, an email-plugin or a MMS-plugin. More specifically, the communications interface manager 106 is designed to accept and employ the protocol-plugins in a modularized manner. The protocol-plugins may be written using an application programming interface (API) that is either proprietary or open-source in nature. For instance, in situations where the information processing and delivery system 100 is unable to communicate with a device via a new communication protocol, a protocol-plugin for the new communication protocol may be written using the API. The information processing and delivery system 100 then uses the new protocol-plugin to communicate with the device thereafter.

The requests received via the input devices 114 include a content data, a display identifier and a user identifier. The user identifier allows identification of a user of the input device 114 for various purposes including, but not limited to, authenticating the user identity, billing the user for usage of services and compiling usage volume for loyalty or reward schemes. Depending on the type of input device 114 being used for transmitting the request, the user identifier may be a cellular phone number, a subscriber identity module (SIM) card number, a landline telephone number, an IP address, an email address or a suitable device identification number. However, it is to be understood that other forms of user identification may also be envisaged.

In an exemplary embodiment, the communications interface manager 106 first authenticates a user who sends the request to the information processing and delivery system 100. The user may be a member of the public or, a merchant who wishes to advertise his goods/services offerings. More particularly, the communications interface manager 106 ascertains whether the user has an access right to the information processing and delivery system 100 by validating the user identifier against a predetermined database. The database may contain records of user identifiers corresponding to users who are authorized to access or use the information processing and delivery system 100. The database may be compiled by a system administrator of the information processing and delivery system 100 using information available from commercial sources. Alternatively, the database may be acquired from service providers such as internet/telecommunication service providers. Yet alternatively, validation of the user identity may be performed using multiple, mixed databases from various different sources. If validation of the user identifier is successful (i.e. the user has an access right), or if validation of the user identifier is not required (i.e. the user authentication feature is not enabled), the content processor 108 will proceed to validate the content data and display identifier. Conversely, if validation of the user identifier is unsuccessful (i.e. the user does not have an access right), the request is discarded and an error message may be generated and recorded by a message logging module 218 (refer to FIG. 2). The user may then be appropriately notified.

In relation to validation of the content data, the content processor 108 examines the quality of the content data. In particular, the content data is assessed against one or more predetermined assessment criteria, including but not limited to, acceptability for public viewing, relevance to target viewers having access to the display devices 102A, 102B, 102C, . . . , 102N as identified in the request. The content data may be solicitation-based (e.g. advertisements, promotional materials), or information-based (e.g. event announcements, alerts, circulars), or a combination of both. Other examples of content data include content pages (e.g. web pages), search results, emails, instant messaging (IM) messages, audio/video content or files (e.g. television programming) or other files and data of definable concepts. It is to be appreciated that examples of content data are not limited to the above and other types of content data may be envisaged. If the content processor 108 ascertains the content quality to be unacceptable in view of the assessment criteria, the request is discarded by the information processing and delivery system 100 and an error message may be generated and recorded by the message logging module 218. The user may also be appropriately notified. However, if the content quality is ascertained as being acceptable, the content processor 108 will then proceed to validate the display identifier.

In relation to validation of the display identifier, the content processor 108 checks for the presence of a display identifier in the request. The display identifier may be in the form of IP addresses uniquely assigned to each of the display devices 102A, 102B, 102C, . . . , 102N, or in other "easy-to-remember" formats as well known in the art. If the content processor 108 ascertains that the display identifier is not present in the request or is invalid (i.e. the display identifier or the display device does not exist), the request is discarded and an error message may be generated and recorded by the message logging module 218. The user may also be appropriately notified.

If the validation of the display identifier is successful, the content processor 108 next validates the category type (or file type) of the content data against the display identifier. The category type may be one of text, static graphic, animated graphic, video, audio, electronically downloadable incentives or any combinations thereof. In certain embodiments, the content processor 108 may ascertain the category type of the content data and determine whether the ascertained category type of the content data is acceptable by the identified display device for display thereon. As an illustration, if a request contains a content data of video format type and the display device corresponding to the display identifier as indicated in the request does not accept video contents, the validation would be unsuccessful.

Optionally, the content processor 108 may also adapt the content data to the aspect ratios of the display devices 102A, 102B, 102C, . . . , 102N. This is to ensure the content data would be displayed in the correct aspect ratio on the display devices 102A, 102B, 102C, . . . , 102N for clear viewing. The aspect ratio of an image is defined to be the width divided by the height of the image. Two commonly used aspect ratios for video-graphic displays are 4:3 (i.e. display standards for television and computer monitors) and 16:9 (i.e. high-definition television (HDTV) standards). Alternatively, the aspect ratios may be specified using image resolutions (e.g. an image for HDTV display is required to have an image size of 1920 pixels by 1080 pixels according to the prevailing HDTV standards). Accordingly, the image sizes for other formats may be specified in such similar formats. Separately, still images are also definable using aspect ratios such as 4:3, 3:2 or 7:5.

If all the foregoing validation steps are successful, the content processor 108 transmits the request to the content dispatcher 110. However, if any of the validation steps is unsuccessful, the request is discarded by the information processing and delivery system 100 and an error message may be generated and recorded by the message logging module 218. The user may also be appropriately notified of the error.

Upon successful validation of the display identifier and the category type, the content processor 108 sends the request or the content data to the content dispatcher 110. If the request is sent, the content dispatcher 110 may extract the content data from the request and sends the content data to the display devices 102A, 102B, 102C, . . . , 102N as specified by the display identifier in the request. The content dispatcher 110 may comprise a sub-module known as the content display designer (not shown). The content display designer enables dynamic scheduling of the display sequence of the content data from various requests based on display attributes such as duration and a frequency of displaying the content data. The display attributes may be defined by the user or the administrator of the information processing and delivery system 100.

Further, on each of the display devices 102A, 102B, 102C, . . . , 102N, a sub-module known as the content display player (not shown) may be installed. Notably, the content displayer player and the content dispatcher 110 may be equipped with a common internal communication protocol to enable them to establish communication with each other to facilitate the sending of requests and other instructions. The content dispatcher 110 then transmits the requests to the content display players of the respective display devices 102A, 102B, 102C, . . . , 102N via the communications network 104. Alternatively, only the content data may be media-streamed to the respective display devices 102A, 102B, 102C, . . . , 102N through the communications network 104. Optionally, the content dispatcher 110 may also encrypt the request before transmitting it to the display devices 102A, 102B, 102C, . . . , 102N.

It is to be appreciated that a time period between receiving a request by the communication interface manager 106 and transmitting the request by the content dispatcher 110 to the respective display devices 102A, 102B, 102C, . . . , 102N is relatively short and hence the transmission may considered to be executed in real-time.

The transaction manager 112 enables an administrator to process and record transactions of the users of the information processing and delivery system 100. More specifically, the transaction manager 112 may generate a billing record upon successful processing and delivery of a request. The billing record is to be associated with the user identifier. The billing record may include various details such as the duration of display of the content data, the number of display devices 102A, 102B, 102C, . . . , 102N the content data was displayed on, the total payment required, the points earned for a reward or loyalty scheme and the like. In addition, the transaction manager 112 may also send payment reminders to the users to settle outstanding bills when payment deadlines approach. Optionally, the billing record may include details on costs incurred by the users to their respective Internet/mobile service providers for use of the services provided thereby when the users use their input devices 114. In certain embodiments, the transaction manager 112 may generate transaction records associated with the user identifiers for compiling usage records of the users for purposes such as implementing a related loyalty or rewarding scheme. In addition, the transaction manager 112 may also provide the administrator with administrative functions for managing the information processing and delivery system 100. For example, the transaction manager 112 may contain means for allowing the billing record and/or transaction records to be transmitted to the users on a periodic basis or upon successful delivery and processing of each request.

Figure 2:
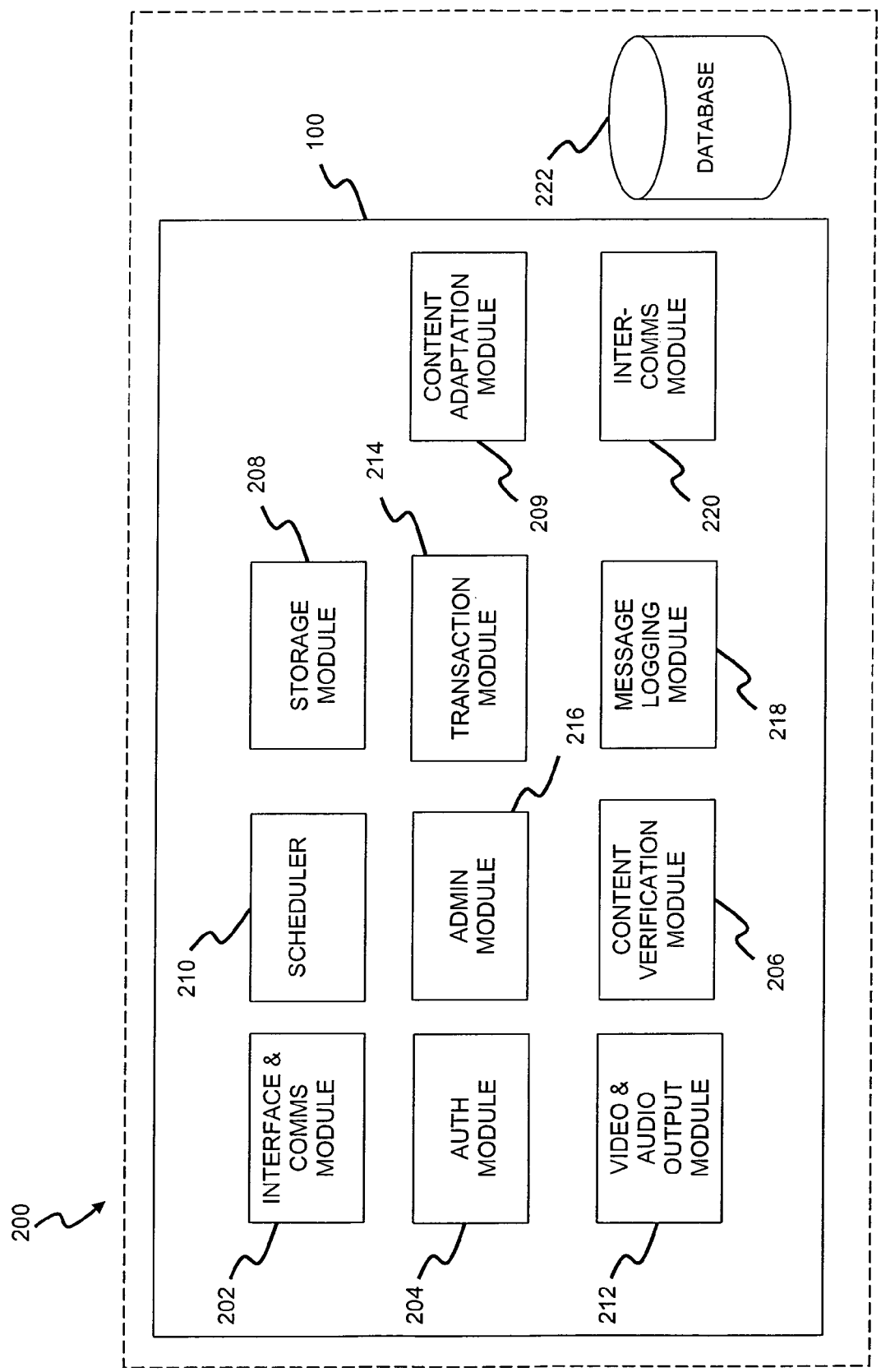
FIG. 2 is a block diagram of the system architecture of the information processing and delivery system of FIG. 1.

Referring to FIG. 2 in which a block diagram of the system architecture 200 of the information processing and delivery system 100 is depicted, the information processing and delivery system 100 comprises various modules and databases for providing functionalities for processing the requests and displaying of content data. As exemplified in FIG. 2, the information processing and delivery system 100 comprises the following modules: an interface and communications module 202, an authentication module 204, a content verification module 206, a storage module 208, a content-adaptation module 209, a scheduler module 210, a video and audio output module 212, a transaction module 214, an administrative module 216, the message logging module 218 and an inter-communications module 220. The information processing and delivery system 100 is provided with access to a database 222 which may contain records of user identifiers pre-authorized for access to the information processing and delivery system 100. It is to be appreciated that each module may be configured as a software application executed on computer hardware. Optionally, the modules may be implemented as application-specific integrated circuits (ASICs) or a combination of hardware and software or other suitable configuration. Moreover, the modules may be combined or separated into multiple additional modules.

The interface and communications module 202 provides a communication link between the information processing and delivery system 100 and the input devices 114. For example, the interface and communications module 202 may be a network-interface card and the corresponding device drivers to enable bi-directional communication. Further, the interface and communications module 202 may also enable an administrator of the information processing and delivery system 100 to establish communication therewith for performing system management operations such as maintenance, software upgrades and the like. The interface and communications module 202 may also send the requests over the communications network 104 to the display devices 102A, 102B, 102C, . . . , 102N after the requests have been processed. Optionally, the interface and communications module 202 may feed the requests into an encryption module (not shown) to be encrypted before sending the requests to the display devices 102A, 102B, 102C, . . . , 102N. Decryption of the encrypted requests may be performed by the display devices 102A, 102B, 102C, . . . , 102N upon receipt before the content data is extracted for display thereon.

The authentication module 204 provides the required functionalities for the information processing and delivery system 100 to authenticate a user transmitting a request to the information processing and delivery system 100. The authentication module 204 may access the database 222 for validating user identities and may include implementing any security-authentication protocol as known in the art for such purposes. Separately, the database 222 may be pre-compiled by the administrator or acquired from other commercial sources. In addition, results of the authentication may be generated by the authentication module 204 and recorded by the message logging module 218 to be stored in the storage module 208. The storage module 208 may be a computer hard disk, a solid-state hard disk or any recording medium that allows record and retrieval of digital information.

The content verification module 206 verifies the content data of the requests based on the attributes. Further, the content verification module 206 comprises content recognition algorithms that process the requests to facilitate recognition and classification of the requests according to their content data type. In addition, the content verification module 206 also accepts content data of any file formats that are known in the art.

Once the content data has been processed by the content verification module 206, the content data is then sent to the content-adaptation module 209 in which the content data is adapted accordingly depending on the display devices 102A, 102B, 102C, . . . , 102N on which the content data is to be displayed. Hence, the content-adaptation-module 209 comprises video and image adaptation algorithms that will enable manipulation, such as shrinking or enlarging, of the content data while simultaneously maintaining the correct aspect ratio for the content data. Notably, the content data is adapted according to the actual area of a section of the display screen of the display device on which the content data is to be displayed subsequently.

Based on the volume or number of requests received by the information processing and delivery system 100 and the display identifiers as indicated in the requests, the scheduler module 210 may devise an appropriate display schedule. The display schedule, along with the content data to be displayed, are sent to one or more of the display devices 102A, 102B, 102C, . . . , 102N by the interface and communications module 202 over the communications network 104.

The video and audio output module 212 may output content data such as still or moving video images, text or animated graphics on an integral display screen of each of the display devices 102A, 102B, 102C, . . . , 102N. The display screen may comprise a LCD display screen, a plasma display screen, a projection display screen, a holographic-type display or an OLED screen. Further, the video and audio output module 212 may also comprise one or more audio loudspeaker devices that output audio including speech, music and/or other sound effects that may or may not be correlated to the output of the video and audio output module 212.

The transaction module 214 monitors and records any transactions of the users who use the information processing and delivery system 100 and provides billing services, such as generating and forwarding billing invoices, to the users. Moreover, the transaction module 214 allows the administrator of the information processing and delivery system 100 to specify billing terms to be included in the billing invoices, for example the duration of display of the content data, the number of display devices 102A, 102B, 102C, . . . , 102N the content data was displayed on, the total payment required, the points earned for a rewarding scheme and the like. Further, the transaction module 214 may also optionally generate transaction records associated with the user identifiers for compiling usage records of the users. In addition, the transaction module 214 may also optionally send payment reminders to the users on outstanding bills when payment deadlines approach.

The administrative module 216 comprises essential administrative functions for the administrator to manage the information processing and delivery system 100. The administrative functions may include status check on number of users logged into the information processing and delivery system 100, remote powering on and off, software updates, performance monitoring, statics gathering, setting access control and any other relevant administrative functions. Yet additionally, the administrative module 216 may also provide an interface such as a web-based interface for access to the administrative functions.

The inter-communications module 220 communicates and relays information, such as the requests and content data, between the different modules of the information processing and delivery system 100. The inter-communications module 220 may preferably adopt a proprietary transport protocol that is specifically customized for communicating information between the various modules illustrated in FIG. 2. In addition, the inter-communications module 220 may also comprise a security sub-module (not shown) for encrypting the information such that the information remains secure during transit. Further, the inter-communications module 220 may also deliver the content data to the display devices 102A, 102B, 102C, . . . , 102N after the requests have been processed by the various modules.

Figure 3:
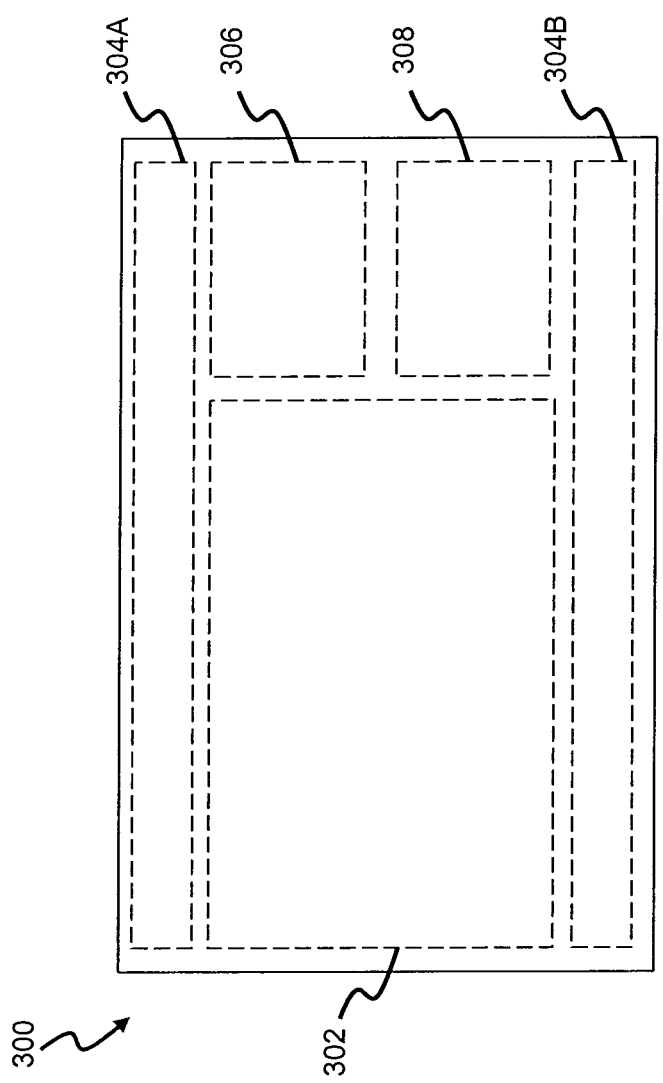
FIG. 3 shows an example screen layout of a display device used in conjunction with the information processing and delivery system of FIG. 1.

FIG. 3 shows an exemplary screen layout of a display screen 300 of a display device. The display screen 300 is divided into multiple pre-designated display zones. Each display zone displays content data of specific type as pre-determined by the administrator of the information processing and delivery system 100. The display screen 300 includes the following display zones: a video display zone 302, text display zones 304A, 304B, an image display zone 306 and an animated graphics display zone 308.

The video display zone 302 may be allocated for the display and playback of any multimedia video clips. The text display zones 304A, 304B may be located at the top and bottom sections of the display screen 300. Text displayed in the text display zones 304A, 304B may scroll from the left to right of the display screen 300 and, in this way, the text display zones 304A, 304B may be continuously refreshed and updated with newer content data. The image display zone 306 on the other hand may display static images while the animated graphics display zone 308 may display animated graphics such as moving-jpeg images. It is to be appreciated that the screen layout in FIG. 3 is not construed to be limited to the illustrated layout. In certain embodiments, the display zones in the display screen 300 are dynamically reconfigurable by the administrator during operation of the information processing and delivery system 100. In other embodiments, the display screen 300 may be divided into display zones of other different configurations or may even be dedicated to displaying only content data of a single specific category type.

Figure 4:
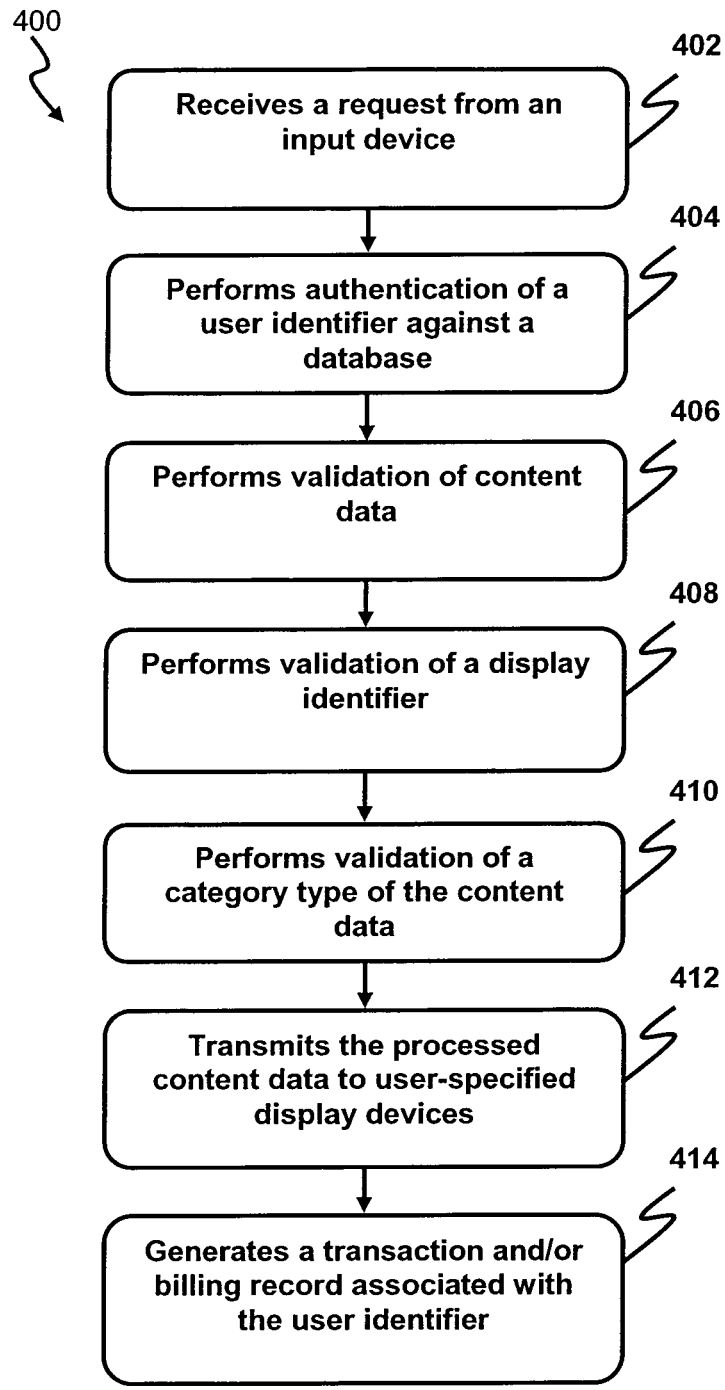
FIG. 4 shows a flow diagram illustrating an information processing and delivery method in accordance with some embodiments.

Referring to FIG. 4, a flow diagram of an information processing and delivery method 400 according to one embodiment of the invention is depicted. The method 400 begins when the information processing and delivery system 100 receives a request from a user via an input device 114 (block 402). The user may be a member of the public or a merchant who wishes to advertise his goods/services offerings. The request includes a content data specified by the user, a display identifier to indicate the display devices 102A, 102B, 102C, . . . , 102N for displaying the content data and a user identifier. Upon receipt of the request, authentication of the user may be performed (block 404). In this respect, a user identifier is validated against one or more databases to ascertain whether the user identifier has an access right to the information processing and delivery system 100. Upon successful authentication of the user identifier, a transaction confirmation code may optionally be generated and sent to the user. Next, the quality of the content data is validated against pre-determined assessment criteria (block 406). This may involve assessing whether the content data is suitable for display in a public setting for viewing. The assessment of the content data may be automated using software or manually performed by the administrators. It is to be understood that other types of assessment criteria may be applicable.

The method 400 then proceeds to validate the display identifier (block 408) to ascertain whether the specified display identifier of the display devices 102A, 102B, 102C, . . . , 102N exists. Upon successful validation of the display identifier, the method 400 may then proceed to validate the category type of the content data against the display identifier (block 410). More particularly, the category type is checked for compatibility with the display identifier. The category type may be first ascertained before being checked against the display identifier. As described in the foregoing paragraphs, a display device may accept and display content data of selected file formats or category types. If the category type of a content data in a request matches the one of the formats acceptable by the specified display devices 102A, 102B, 102C, . . . , 102N, validation of the category type is considered successful.

If validations of the user identifier, content data, display identifier and category type are successful, the method 400 then proceeds to transmit the request or the content data to the respective display devices 102A, 102B, 102C, . . . , 102N to be displayed thereon (block 412). The corresponding display attributes (e.g. duration and frequency) may be specified by the user or the administrator of the information processing and delivery system 100. If any of the validation fails, the method 400 may terminate without further transmitting the request to the respective display devices 102A, 102B, 102C, . . . , 102N. The user may then be appropriately notified.

Upon transmitting the request to the respective display devices 102A, 102B, 102C, . . . , 102N, a transaction record and/or billing record may be generated which is to be associated with the user identifier (block 414). Optionally, payment reminders may be sent to the user to settle outstanding payments when payment deadlines approach.

In the above-described method 400, it is to be understood that authentication of the user identifier (block 404) may be optional and may be determined as such by an administrator of the information processing and delivery system 100.

In the above-described method 400, it is to be understood that validation of the category type of the content data (block 410) may be optional if the display devices 102A, 102B, 102C, . . . , 102N accepts all types of file formats or category types.

Figure 5:
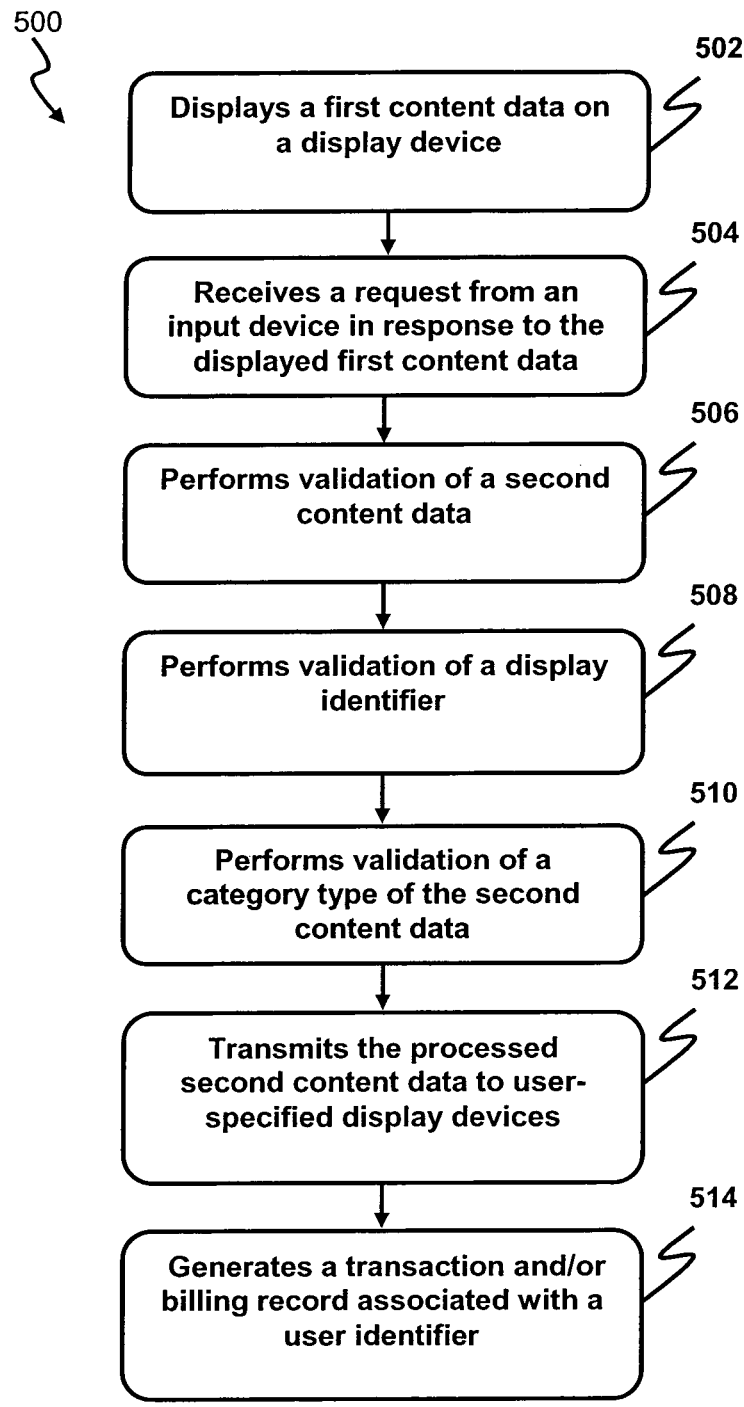
FIG. 5 shows a flow diagram illustrating an information processing and delivery method in accordance with some embodiments.

Referring to FIG. 5, a flow diagram of an information processing and delivery method 500 according to another embodiment of the invention is depicted. A first content data (e.g. an advertisement) may be displayed on one or more display devices 102A, 102B, 102C, . . . , 102N (block 502). The first content data may have been pre-processed using the method 400 of FIG. 4 before being displayed. The first content data is preferably solicitation-based to allow viewers (i.e. the users) to respond. The first content data may include one or more interactive features to allow the viewers to respond to the first content data. Examples of the interactive features include, but are not limited to, email addresses, fax numbers, website addresses, contact number for sending short message service (SMS) or multimedia messaging service (MMS) messages.

A viewer may respond to the first content data by sending a request to the information processing and delivery system 100. The method 500 may then proceed to receive the request from the viewer via one of the interactive features (block 504). In this embodiment, the request may include a second content data and a display identifier. Upon receipt of the request, a transaction confirmation code may optionally be generated and sent to the viewer. The method 500 then proceeds to validate the second content data (block 506, similar to block 406), validate the display identifier (block 508, similar to block 408), validate the category type of the second content data against the display identifier (block 510, similar to block 410), transmit the request to display devices 102A, 102B, 102C, . . . , 102N specified by the display identifier for display (block 512, similar block 412), and generate a transaction record (block 514, similar to block 414). The various processes of the blocks 506 to 514 of FIG. 5 are similar to the blocks 406 to 414 of FIG. 4 respectively as described in the foregoing paragraphs.

In the afore-described method 500 of FIG. 5, the request may also include a user identifier and the method 500 may further include authenticating a user identifier prior progressing to the various validating processes of the blocks 506 to 510. Alternatively, authenticating the user identifier may be optional and may be determined as such by the administrator of the information processing and delivery system 100.

In the afore-described method 500 of FIG. 5, it is further understood that the validation of the category type of the content data (block 510) may be optional if the display devices 102A, 102B, 102C, . . . , 102N accepts all types of file formats or category types.

In the aforementioned methods 400, 500 and the various embodiments of the invention, it is to be understood that modifications may be made without departing from the inventive concept of the invention. For example, the afore-described sequences of validating the content data, the display identifier, and the category type of the content data may be modified or interchanged. Similarly, authentication of a user may be performed at other stages in the afore-described methods 400, 500.

Figure 6:
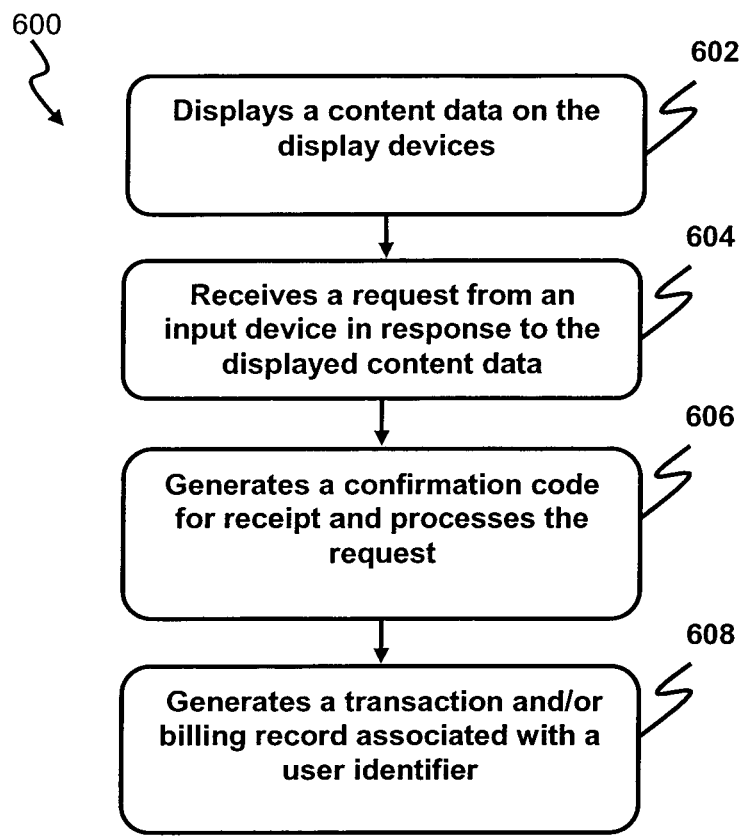
FIG. 6 shows a flow diagram illustrating an information processing and delivery method in accordance with some embodiments.

Further, in accordance to yet another embodiment of the invention, a flow diagram of an information processing and delivery method 600 is shown in FIG. 6. Firstly, a content data (e.g. an advertisement) may be displayed on one or more display devices 102A, 102B, 102C, ..., 102N (block 602). The content data may have been pre-processed using the method 400 of FIG. 4 before being displayed. The content data may be sent by a merchant who wishes to advertise his goods and/or services. In addition, the content data is preferably solicitation-based to allow viewers (i.e. the users) to respond. Notably, to enable the viewers to respond to the content data, the content data may include one or more interactive features. For instance, the interactive features may include, but are not limited to, email addresses, fax numbers, website addresses, contact number for sending short message service (SMS) or multimedia messaging service (MMS) messages.

A viewer may respond to the content data by sending a request to the information processing and delivery system 100. The method 600 may then proceed to receive the request from the viewer via one of the interactive features where the request may include a user identifier (block 604). In this embodiment, validations for the content data, the display identifier and the category type of the content data may not be required unlike in the foregoing methods 400, 500. Hence, once the request is received by the information processing and delivery system 100, a transaction confirmation code may optionally be generated and sent to the viewer (block 606). The request may be processed by the information processing and delivery system 100, such as, by transmitting the request to a transaction server or a processor-based device maintained or designated by the merchant who first initiated the display of the content data. Subsequently, a transaction record and/or billing record may be generated which is to be associated with the user identifier (block 608). Optionally, payment reminders may also be sent to the viewer to settle outstanding payments when payment deadlines approach. Optionally, the user identifier may be validated to determine if the viewer has an access right to the information processing and delivery system 100 after the user request is received thereby.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. An information processing and delivery method comprising:
   receiving on a computer a plurality of requests from a plurality of users via a plurality of communication protocols, each of the requests including a content data, a display identifier and a user identifier;
   validating the content data and the display identifier;
   upon successfully validating the content data and the display identifier, transmitting the content data through an Internet Protocol (IP) based network to at least one display device associated with the display identifier to be displayed thereon;
   displaying the content data on at least one display device; and
   wherein the plurality of communication protocols include internet protocol, and at least one of short message service (SMS) and multimedia messaging service (MMS).

2. The method of claim 1, further comprising:
   ascertaining a category type of the content data and validating the ascertained category type against the display identifier.

3. The method of claim 2, wherein the content data is to be displayed on a predetermined screen section of the at least one display device, the predetermined screen section being designated for the ascertained category type.

4. The method of claim 2, wherein the ascertained category type is one of text, static image, video, audio and animated graphics.

5. The method of claim 1, further comprising:
   ascertaining an access right of the user identifier by validating the user identifier against a predetermined database.

6. The method of claim 5, wherein transmitting of the content data is to proceed upon successfully ascertaining the validity of the access right of the user identifier.

7. The method of claim 1, further comprising:
   generating a billing record associated with the user identifier.

8. The method of claim 1, further comprising:
   generating a transaction record associated with the user identifier for compiling a usage record.

9. The method of claim 1, wherein a time period between receiving the each of the requests and transmitting the content data is substantially real-time.

10. The method of claim 1, further comprising:
    encrypting the content data prior to transmission thereof.

11. The method of claim 1, further comprising:
    ascertaining display attributes for displaying the content data, the display attributes including one of a duration and a frequency of displaying the content data.

12. The method of claim 1, wherein the at least one display device is one of a liquid crystal display (LCD) screen, a plasma display screen, an electronic billboard, a projection display screen, a holographic-type display and an organic light-emitting diode (OLED) screen.

13. The method of claim 1, wherein displaying the content data includes displaying the content data on a predetermined screen section of the at least one display device, the predetermined screen section being designated for a predetermined category type.

14. The method of claim 1, wherein the each of the requests is received from a processor-based device, the processor-based device being one of a computing device, a fax machine and a cellular phone.

15. The method of claim 1, wherein the each of the requests is received from one of an analog device, a digital device and an IP-enabled device.

16. The method of claim 1, wherein the plurality of communication protocols further include at least one of email and fax.

17. The method of claim 1, further comprising: upon unsuccessfully validating at least one of the content data and the display identifier, generating and recording an error message.

18. A system for information processing and delivery, the system comprising:

an input processing module in a computer for receiving a plurality of requests from a plurality of users via a plurality of communication protocols, each of the requests including a content data, a display identifier and a user identifier;

a content processing module for validating the content data and the display identifier;

at least one display associated with the display identifier to be displayed thereon upon successfully validating the content data and the display identifier, a content delivery module for transmitting the content data through an Internet Protocol (IP) based network to the at least one display;

a display module for displaying the content data on at least one display; and wherein the plurality of communication protocols include internet protocol, and at least one of short message service (SMS) and multimedia messaging service (MMS).

19. The system of claim 18, wherein the content processing module is further for ascertaining a category type for the content data and validating the ascertained category type against the display identifier.

20. The system of claim 19, wherein the content data is to be displayed on a predetermined screen section of the at least one display device, the predetermined screen section being designated for the ascertained category type.

21. The system of claim 19, wherein the ascertained category type is one of text, static image, video, audio and animated graphics.

22. The system of claim 18, wherein the input processing module is further for ascertaining an access right of the user identifier by validating the user identifier against a predetermined database.

23. The system of claim 22, wherein the content delivery module is further for transmitting the content data upon successfully ascertaining the validity of the access right of the user identifier.

24. The system of claim 18, further comprising:
a transaction processing module for generating a billing record associated with the user identifier.

25. The system of claim 18, wherein the transaction processing module is further for generating a transaction record associated with the user identifier for compiling a usage record.

26. The system of claim 18, wherein a time period between receiving the each of the requests by the input processing module and transmitting the content data by the content delivery module is substantially real-time.

27. The system of claim 18, further comprising:
an encryption module for encrypting the content data prior to transmission thereof.

28. The system of claim 18, wherein the content delivery module is further for ascertaining display attributes for displaying the content data, the display attributes being at least one of a duration and a frequency of displaying the content data.

29. The system of claim 18, wherein the at least one display device is one of a liquid crystal display (LCD) screen, a plasma display screen, an electronic billboard, a projection display screen, a holographic-type display and an organic light-emitting diode (OLED) screen.

30. The system of claim 18, wherein the content delivery module is further for displaying the content data on a predetermined screen section of the at least one display device, the predetermined screen section being designated for a predetermined category type.

31. The system of claim 18, wherein the each of the requests is received from a processor-based device, the processor-based device being one of a computing device, a fax machine and a cellular phone.

32. The system of claim 18, wherein the each of the requests is received from one of an analog device, a digital device and an IP-enabled device.

33. The system of claim 18, wherein the plurality of communication protocols further include at least one of email and fax.

34. The system of claim 18, further comprising:
a message logging module for generating and recording an error message upon unsuccessfully validating at least one of the content data and the display identifier.

35. An information processing and delivery method comprising:
receiving in a computer a plurality of first requests from a plurality of users via a plurality of communication protocols, each of the first requests including a first content data, a first display identifier and a first user identifier; validating the first content data and the first display identifier; upon successfully validating the first content data and the first display identifier, transmitting the first content data through an Internet Protocol (IP) based network to at least one display device associated with the first display identifier to be displayed thereon; receiving a second request via one of the plurality of communication protocols in response to the displayed first content data, the second request including a second user identifier; generating a transaction confirmation which is to be transmitted to a user associated with the second user identifier; and generating a transaction record associated with the second user identifier, wherein the plurality of communication protocols include internet protocol, and at least one of short message service (SMS) and multimedia messaging service (MMS).

36. The method of claim 35, wherein the plurality of communication protocols further include at least one of email and fax.

37. The method of claim 35, wherein the each of the first requests is received from a processor-based device, the processor-based device being one of a computing device, a fax machine and a cellular phone.

38. The method of claim 35, wherein the each of the first requests is received from one of an analog device, a digital device and an IP-enabled device.

39. The method of claim 35, further comprising:
upon unsuccessfully validating at least one of the first content data and the first display identifier, generating and recording an error message.

40. The method of claim 35, wherein the transaction confirmation is transmitted to the user associated with the second identifier via the one of the plurality of communication protocols.

41. The method of claim 35, further comprising:
generating a billing record associated with the first user identifier.

42. The method of claim 35, further comprising:
validating the first user identifier prior to transmitting the first content data.

43. The method of claim 35, further comprising:
generating a billing record associated with the second user identifier.

44. The method of claim 35, further comprising:
generating a payment reminder for the billing record and transmitting the payment reminder to the user associated with the second user identifier.

\* \* \* \* \*